United States Patent Office 2,807,570
Patented Sept. 24, 1957

2,807,570
RECOVERY OF PETROLEUM OIL

David M. Updegraff, Dallas, Tex., assignor, by mesne assignments, to Socony Mobil Oil Company, Inc., a corporation of New York No Drawing. Application January 16, 1953, Serial No. 331,733

16 Claims. (Cl. 195—3)

This invention relates to recovery of petroleum oil from oil-bearing earth formations and relates more particularly to secondary recovery of petroleum oil from these formations.

Petroleum oil is generally recovered from oil-bearing earth formations initially as a result of gas pressure, rock pressure, or natural water drive forcing the oil from the formation through the producing well to the surface. As oil production continues, the reservoir energy gradually decreases and finally becomes insufficient to force the oil to the surface, although a major portion of the original quantity of the oil in the formation remains therein. To increase the ultimate recovery of the oil, pumping is then employed but when the rate of recovery by pumping falls to an uneconomically low level, a further increase in the ultimate recovery of the oil may still be economically effected by the employment of secondary recovery methods such as gas drive or water flooding.

It is an object of this invention to provide a method for secondary recovery of petroleum oil from oil-bearing earth formations. It is another object of this invention to increase the extent of recovery of petroleum oil from oil-bearing earth formations. It is another object of this invention to increase the efficiency of water flooding of oil-bearing earth formations. These and other objects of the invention will become apparent from the following description thereof.

In accordance with the invention, an oil-bearing earth formation is inoculated with bacteria capable of fermenting a carbohydrate with the production of substantially large amounts of gases, i. e. a gas-producing bacteria, and a carbohydrate capable of being fermented by the bacteria is injected into the formation.

I have found that, by inoculating an oil-bearing earth formation with bacteria capable of fermenting a carbohydrate with the production of substantially large amounts of gases and injecting into the formation a carbohydrate capable of being fermented by the bacetria, an enhanced recovery of the petroleum oil from the formation is obtained. The enhanced recovery is believed to arise as the result of several mechanisms. The bacteria, fermenting the carbohydrate within the oil-bearing formation, produce large amounts of fermentation gases within the formation and a portion or components of these gases are soluble in the oil contained in the formation and the remainder or other components of these gases are insoluble in the oil and water contained in the formation. The oil-soluble portion of components of the fermentation gases dissolving in the oil decrease the viscosity of the oil, reduce the interfacial tension between the oil and the water, and increase the volume of the oil, all of which assist in removal of the oil from the formation. The oil- and water-insoluble portion or components of the fermentation gases, not dissolving in the formation liquids, increase the pressure within the formation and physically displace the oil therefrom. Further, in carbonate formations, the acids produced by the bacterial fermenation react with the formation to produce additional amounts of an oil-soluble gas, namely, carbon dioxide, and to form channels and voids within the formation with consequent increase in the permeability of the formation. Further, any nitrate or nitrite ions within the oil-bearing formation may be denitrified with the production of nitrogen gas to further increase the pressure within the formation.

In the practice of the invention, an oil-bearing earth formation penetrated by a well bore hole may be inoculated with the bacteria and the carbohydrate, in aqueous solution, injected thereto through the bore hole. The formation may be first inoculated with the bacteria and the carbohydrate solution thereafter injected or the carbohydrate solution may be first injected into the formation and the formation thereafter inoculated with the bacteria. Alternatively, the formation may be inoculated and the carbohydrate solution injected thereto simultaneously by injecting the carbohydrate solution inoculated with the bacteria into the formation. Following inoculation of the formation and injection of the carbohydrate solution, fermentation of the carbohydrate may be permitted to take place within the formation and the oil produced as a result thereof recovered from the same well bore hole through which the formation was inoculated and the carbohydrate injected.

It is preferred, in the practice of the invention, however, to inoculate the formation and inject the carbohydrate solution through a well bore hole leading to the formation and drive the oil to another well bore hole leading to the formation for recovery of the oil therefrom. The invention, therefore, can be carried out in connection with conventional water flooding procedures. The bacteria and the carbohydrate can be separately added to the water forced through the injection well and the oil-bearing earth formation or can be added in admixture with each other to the injected flood water.

Where the bacteria and the carbohydrate are added to the water injected into an oil-bearing earth formation through an input well to drive the oil therein to an output well or wells, the formation need only be inoculated once in most instances since generally the growth and multiplication of the bacteria in the earth formation are sufficiently rapid compared with the sweep velocity of the flood water that the bacteria will be distributed throughout the entire area in the earth formation swept by the water originally containing the inoculant. However, where necessary or desired, the formation may be inoculated a number of times during water flooding. The carbohydrate may be intermittently injected into the formation or, preferably, the carbohydrate is injected continuously into the formation along with the flood water.

While treatment of an oil-producing formation may be carried out in accordance with the invention in connection with conventional water drive procedures where the flood water is continuously injected into an input well or wells, it may also be carried out in accordance with the invention in connection with intermittent injection of flood water into an input well or wells.

The bacteria employed for inoculation of the oil-bearing earth formation may be any type of bacteria capable of fermenting a carbohydrate with the production of substantially large amounts of gases. Additionally, the bacteria must be anaerobic, i. e., capable of growing and multiplying in the absence of free oxygen. The anaerobic bacteria may be facultative anaerobes capables of growing and multiplying either in the presence or absence of free oxygen or obligate anaerobes capable of growing and multiplying only in the absence of free oxygen. Criteria for selecting any type of bacteria possessing these qualifications include size and motility to enable ready penetration into the oil-bearing earth formation, volume and pressure of gases produced by fermentation of carbohydrate, rapidity of multiplication, activity at earth formation temperatures, resistance to inhibition by reservoir fluids, and inability to produce disease in humans or domestic animals. All members of the genus Aerobacter and Escherichia, such as *Aerobacter aerogenes*, *Escherichia coli*, and *Escherichia freundii*, are satisfactory. Several members of the genus Clostridium, such as *Clostridium butyricum*, *Clostridium butylicum*, and *Clostridium acetobutylicum* are also satisfactory. Other bacteria giving satisfactory results are *Bacillus macerans* and *Bacillus polymyxa*. Pure cultures of the bacteria may be employed, or enrichment cultures, or other mixtures, of the bacteria may also be employed.

For inoculation of the formation, the medium containing the culture may contain between 1,000 and several million bacteria per milliliter of medium. Larger and smaller numbers of bacteria per unit volume of medium may also be employed, if desired. The total number of bacteria for inoculating a formation may be between about $10^6$ and about $10^{16}$. The medium containing the culture for inoculating the formation may be an aqueous nutrient inorganic salt medium, an aqueous nutrient inorganic salt medium containing dissolved therein a portion of the carbohydrate to be employed, or, as previously stated, may be the water employed for flooding the formation. Gas-producing fermentation bacteria require an environment containing the following, as inorganic, or mineral elements:

| Ion: | Concentration—parts per million of water |
|---|---|
| Sulfate | 5 to 25,000 |
| Phosphate | 5 to 1,000 |
| Ammonium or nitrate | 5 to 1,000 |
| Potassium | 5 to 1,000 |
| Calcium | 5 to 100,000 |
| Ferrous iron | 5 to 50 |
| Magnesium | 5 to 100,000 |

However, water ordinarily employed for water flooding purposes in oil-bearing earth formations may naturally contain these nutrient, inorganic salts in sufficient quantity and no care need be taken, unless chemical analysis shows deficiencies, to supply these salts in the medium employed for inoculating the formation with the culture where the flood water is employed as the medium.

The carbohydrate to be injected in to the oil-bearing earth formation may be any type of carbohydrate capable of being fermented with production of substantially large quantities of gases by the bacteria employed for inoculation of the formation. The carbohydrate must also be water soluble. Suitable carbohydrates include dextrose, sucrose, and other sugars. It is preferred, however, to employ carbohydrate-containing mixtures such as molasses not only in view of their economy but also in view of their content of amino acids and growth factors or vitamins which assist in the growth and multiplication of the bacteria. Corn steep liquor may also be employed but, while it is an excellent source of amino acids and growth factors, it has a rather low carbohydrate concentration. The concentration of carbohydrate in the solution injected into the oil-bearing earth formation may be between 0.5 and 20 percent by weight, although other concentrations of carbohydrate may be employed if desired. Where molasses or other carbohydrate-containing mixtures are employed, their concentrations should be such that the carbohydrate content of the solution is between 0.5 and 20 percent or higher by weight.

By molasses, I mean the uncrystallizable sirup obtained during boiling down of raw cane sugar or raw beet sugar. The commercial product may contain between about 40 and 75 percent by weight of carbohydrates and the commercial product may be used in the practice of the invention. Molasses is commercially available in several grades, the grades differing from each other with respect to their degree of refinement. The cruder grades, having been subjected to a lesser degree of refinement, contain larger quantities of amino acids, growth factors, and mineral constituents and, therefore, are to be preferred to the more highly refined grades.

Where sugars or molasses or other carbohydrate-containing mixtures and bacteria of th genera Aerobacter or Escherichia or *Clostridium butyricum*, *Clostridium butylicum*, *Clostridium acetobutylicum*, *Bacillus macerans*, or *Bacillus polymyxa* are employed, fermentation proceeds within the oil-bearing earth formation with the production of gases containing from 30 to 60 percent of hydrogen with the remainder being composed substantially of carbon dioxide. The hydrogen has a low solubility in oil and water and thus the gas pressure within the formation is increased. On the other hand, the carbon dioxide is comparatively soluble in water and oil and thereby decreases the viscosity of the oil, reduces the interfacial tension between the oil and the water, and increases the volume of the oil.

The following examples will be illustrative of the invention.

EXAMPLE I

A core sample 3⅝ inches in diameter and 7 inches in length taken from a surface outcropping of an oil-bearing earth formation was placed within the core chamber of a rubber sleeve type Hassler cell. The core sample within the chamber was evacuated, and the pore volume of the core sample was determined with a gas expansion porosimeter. The core sample was evacuated again, and was then saturated with a nutrient aqueous medium containing 5 percent by weight of glucose. The volume of this aqueous medium which entered the core was measured, and the volume in this run and in the second run described hereafter agreed closely with the total pore volume of the core sample. A petroleum oil having a viscosity of 15.8 centipoises at 37° C. was next passed through the core sample until as much of the aqueous medium as possible was displaced therefrom. The volume of aqueous medium displaced from the core sample was measured and this volume gave the oil saturation of the core sample, identified as the original oil saturation, since the volume of displaced aqueous medium is equal to the volume of displacing oil.

As a first water flooding step, aqueous nutrient medium containing 5 percent by weight of glucose was passed therethrough until the volume ratio of aqueous medium to oil in the fluid displaced from the core sample was greater than 1000 to 1. The volume of oil and the volume of aqueous medium issuing from the core sample were measured at frequent time intervals. Thereafter, as a gas drive step, 4½ pore volumes of carbon dioxide were passed through the core sample, and the volume of oil, aqueous medium, and gas issuing from the core sample was measured. As a second water flooding step, the aqueous medium was passed, in a volume equivalent to 1½ pore volumes of the core sample, through the core sample and the volume of oil, aqueous medium, and gas issuing from the core sample was measured. From the measurements of the volume of oil, aqueous medium, and gas issuing from the core sample, the oil saturation of the core sample following the first water flooding step, following the gas drive step, and following the second water flooding step was determined.

A second run was made on the same core sample after removing all oil and water therefrom by flushing with isooctane and acetone and drying with warm air. The cleaned core sample was then placed in the core chamber of the Hassler cell, evacuated, saturated with the aqueous nutrient medium, and as much as possible of the aqueous medium displaced therefrom with oil, all in the same manner as described above. The core sample was subjected to the same first flooding step as described above, but in place of the gas drive step a bacterial fermentation step was substituted therefor. The bacterial fermentation step comprised passing into the core sample aqueous medium containing 1,000,000 cells per milliliter of *Aerobacter aerogenes*, sealing the core sample within the core chamber, and incubating the core sample for six days at 100° F. During the incubation period, the pressure within the core sample increased because of the generation of gases by the bacteria. Following incubation, the pressure was released on the cell and the volume of oil, aqueous medium, and gas issuing from the core sample was measured. Following the bacterial fermentation step, the core sample was subjected to a second water flooding step as described above.

The results are given in the table wherein oil saturation is expressed as the percent of the total pore volume of the core sample occupied by the oil.

|  | Run No. 1 | Run No. 2 |
| --- | --- | --- |
| Original oil saturation | 45 | 45 |
| Oil saturation following first water flooding step | 30 | 30 |
| Oil saturation following gas drive step | 26 |  |
| Oil saturation following bacterial fermentation step |  | 20 |
| Oil saturation following second water flooding step | 24 | 19 |

It will be observed from the table that the first water flooding step reduced the oil saturation of the core sample in both runs from 45 percent to 30 percent, a recovery of 33⅓ percent of the oil originally in the core samples. On the other hand, the gas drive step reduced the oil saturation in the first run to 26 percent whereas the bacterial fermentation step reduced the oil saturation in the second run to 20 percent. Accordingly, the bacterial fermentation step resulted in recovery of 33⅓ percent of the oil remaining in the core sample following the first water flooding step whereas the gas drive step resulted in recovery of only 13⅓ percent of the oil remaining in the core sample following the first water flooding step. Stated otherwise, the bacterial fermentation step resulted in recovery of two and one-half times as much oil as the gas drive step.

It will also be observed from the table that the combination of the bacterial fermentation step and the second gas drive step reduced the oil saturation of the core sample in the second run from 30 percent to 19 percent, a recovery of 36.6 percent of the oil contained in the core sample following the first water drive whereas the combination of the gas drive step and the second water drive step reduced the oil saturation of the second core sample in the first run from 30 percent to 24 percent, a recovery of only 20 percent of the oil contained in the core sample following the first water drive. Thus, the combination of the bacterial fermentation step and the second water flood step resulted in a recovery of almost twice as much oil as the combination of the gas drive step and the second water flood step.

Having thus described my invention, it will be understood that such description has been given by way of illustration and example and not by way of limitation, reference for the latter purpose being had to the appended claims.

I claim:

1. In the recovery of petroleum oil from the oil-bearing formation having a well leading thereto, the method comprising inoculating said formation through said well with a gas-producing bacteria selected from the group consisting of the facultative and obligate anaerobes, passing into said formation through said well water containing a water-soluble carbohydrate, maintaining said water containing said carbohydrate in said formation subject to the action of said bacteria and fermenting said carbohydrate in said formation by said bacteria whereby fermentation gases are produced in said formation, and thereafter recovering petroleum oil from said formation assisted by said fermentation gases.

2. In the recovery of petroleum oil from an oil-bearing formation having a well leading thereto, the method comprising inoculating said formation through said well with a gas-producing bacteria selected from the group consisting of the facultative and obligate anaerobes, passing into said formation through said well water containing dissolved therein a sugar, maintaining said water containing said sugar in said formation subject to the action of said bacteria and fermenting said sugar in said formation by said bacteria whereby fermentation gases are produced in said formation, and thereafter recovering petroleum oil from said formation assisted by said fermentation gases.

3. In the recovery of petroleum oil from an oil-bearing formation having a well leading thereto, the method comprising inoculating said formation through said well with a gas-producing bacteria selected from the group consisting of the facultative and obligate anaerobes, passing into said formation through said well water containing dissolved therein between about 0.5 and 20 percent by weight of sugar, maintaining said water containing said sugar in said formation subject to the action of said bacteria and fermenting said sugar in said formation by said bacteria whereby fermentation gases are produced in said formation, and thereafter recovering petroleum oil from said formation assisted by said fermentation gases.

4. In the recovery of petroleum oil from an oil-bearing formation having a well leading thereto, the method comprising inoculating said formation through said well with a gas-producing bacteria selected from the group consisting of the facultative and obligate anaerobes, passing into said formation through said well water containing dissolved therein a water-soluble sugar, maintaining said water containing said sugar in said formation subject to the action of said bacteria and fermenting said sugar in said formation by said bacteria whereby fermentation gases are produced in said formation, and thereafter recovering petroleum oil from said formation assisted by said fermentation gases.

5. In the recovery of petroleum oil from an oil-bearing formation having a well leading thereto, the method comprising inoculating said formation through said well with a gas-producing bacteria selected from the group consisting of the facultative and obligate anaerobes, passing into said formation through said well water containing dissolved therein sucrose, maintaining said water containing said sucrose in said formation subject to the action of said bacteria and fermenting said sucrose in said formation by said bacteria whereby fermentation gases are produced in said formation, and thereafter recovering petroleum oil from said formation assisted by said fermentation gases.

6. In the recovery of petroleum oil from an oil-bearing formation having a well leading thereto, the method comprising inoculating said formation through said well with a gas-producing bacteria selected from the group consisting of the facultative and obligate anaerobes, passing into said formation through said well water containing dissolved therein dextrose, maintaining said water containing said dextrose in said formation subject to the action of said bacteria and fermenting said dextrose in said formation by said bacteria whereby fermentation gases are produced in said formation, and thereafter recovering petroleum oil from said formation assisted by said fermentation gases.

7. In the recovery of petroleum oil from an oil-bearing earth formation having an input well leading thereto and an output well leading therefrom wherein water is injected into said input well and forced through said formation in the direction of said output well to move oil through said formation in the direction of said output well, the method comprising inoculating said formation through said input well with a gas-producing bacteria selected from the group consisting of the facultative and obligate anaerobes, adding sugar to said water injected into said input well and forced through said formation in the direction of said output well, maintaining said water containing said sugar in said formation subject to the action of said bacteria and fermenting said sugar in said formation by said bacteria whereby fermentation gases are produced in said formation, and thereafter recovering petroleum oil from said formation through said output well assisted by said fermentation gases.

8. In the recovery of petroleum oil from an oil-bearing earth formation having an input well leading thereto and an output well leading therefrom wherein water is injected into said input well and forced through said formation in the direction of said output well to move oil through said formation in the direction of said output well, the method comprising inoculating said formation through said input well with a gas-producing bacteria selected from the group consisting of the facultative and obligate anaerobes, continuously adding sugar to said water injected into said input well and forced through said formation in the direction of said output well, maintaining said water containing said sugar in said formation subject to the action of said bacteria and fermenting said sugar in said formation by said bacteria whereby fermentation gases are produced in said formation, and thereafter recovering petroleum oil from said formation through said output well assisted by said fermentation gases.

9. In the recovery of petroleum oil from an oil-bearing earth formation having an input well leading thereto and an output well leading therefrom wherein water is injected into said input well and forced through said formation in the direction of said output well to move oil through said formation in the direction of said output well, the method comprising inoculating said formation through said input well with a gas-producing bacteria selected from the group consisting of the facultative and obligate anaerobes, intermittently adding sugar to said water injected into said input well and forced through said formation in the direction of said output well, maintaining said water containing said sugar in said formation subject to the action of said bacteria and fermenting said sugar in said formation by said bacteria whereby fermentation gases are produced in said formation, and thereafter recovering petroleum oil from said formation through said output well assisted by said fermentation gases.

10. In the recovery of petroleum oil from an oil-bearing earth formation having an input well leading thereto and an output well leading therefrom wherein water is injected into said input well and forced through said formation in the direction of said output well to move oil through said formation in the direction of said output well, the method comprising inoculating said formation through said input well with a gas-producing bacteria selected from the group consisting of the facultative and obligate anaerobes, adding sugar to said water injected into said input well and forced through said formation in the direction of said output well in an amount between about 0.5 and 20 percent by weight of said water, maintaining said water containing said sugar in said formation subject to the action of said bacteria and fermenting said sugar in said formation by said bacteria whereby fermentation gases are produced in said formation, and thereafter recovering petroleum oil from said formation through said output well assisted by said fermentation gases.

11. In the recovery of petroleum oil from an oil-bearing earth formation having an input well leading thereto and an output well leading therefrom wherein water is injected into said input well and forced through said formation in the direction of said output well to move oil through said formation in the direction of said output well, the method comprising adding to said water injected into said input well and forced through said formation in the direction of said output well a culture of gas-producing bacteria selected from the group consisting of the facultative and obligate anaerobes and a water-soluble sugar, maintaining said water containing said sugar in said formation subject to the action of said bacteria and fermenting said sugar in said formation by said bacteria whereby fermentation gases are produced in said formation, and thereafter recovering petroleum oil from said formation through said output well assisted by said fermentation gases.

12. In the recovery of petroleum oil from an oil-bearing earth formation having a well leading thereto, the method comprising inoculating said formation through said well with a bacteria selected from the group consisting of the genus Aerobacter, the genus Escherichia, the species *Clostridium butyricum*, the species *Clostridium butylicum*, the species *Clostridium acetobutylicum*, the species *Bacillus macerans*, and the species *Bacillus polymyxa*, passing into said formation through said well water containing a water-soluble carbohydrate, maintaining said water containing said carbohydrate in said formation subject to the action of said bacteria and fermenting said carbohydrate in said formation by said bacteria whereby fermentation gases are produced in said formation, and thereafter recovering petroleum oil from said formation assisted by said fermentation gases.

13. In the recovery of petroleum oil from an oil-bearing earth formation having a well leading thereto, the method comprising inoculating said formation through said well with a bacteria selected from the group consisting of the genus Aerobacter, the genus Escherichia, the species *Clostridium butyricum*, the species *Clostridium butylicum*, the species *Clostridium acetobutylicum*, the species *Bacillus macerans*, and the species *Bacillus polymyxa*, passing into said formation through said well water containing sugar, maintaining said water containing said sugar in said formation subject to the action of said bacteria, and fermenting said sugar in said formation by said bacteria whereby fermentation gases are produced in said formation, and thereafter recovering petroleum oil from said formation assisted by said fermentation gases.

14. In the recovery of petroleum oil from an oil-bearing earth formation having a well leading thereto, the method comprising inoculating said formation through said well with a bacteria selected from the group consisting of the genus Aerobacter, the genus Escherichia, the species *Clostridium butyricum*, the species *Clostridium butylicum*, the species *Clostridium acetobutylicum*, the species *Bacillus macerans*, and the species *Bacillus polymyxa*, passing into said formation through said well water containing a water-soluble sugar, maintaining said water containing said sugar in said formation subject to the action of said bacteria and fermenting said sugar in said formation by said bacteria whereby fermentation gases are produced in said formation, and thereafter recovering petroleum oil from said formation assisted by said fermentation gases.

15. In the recovery of petroleum oil from an oil-bearing earth formation having an input well leading thereto and an output well leading therefrom wherein water is injected into said input well and forced through said formation in the direction of said output well to move oil through said formation in the direction of said output well, the method comprising inoculating said formation through said input well with a gas-producing bacteria selected from the group consisting of the facultative and obligate anaerobes, adding a water-soluble carbohydrate to said water injected into said input well and forced through said formation in the direction of said output well, maintaining said water containing said carbohydrate in said formation subject to the action of said bacteria and fermenting said carbohydrate in said formation by said bacteria whereby fermentation gases are produced in said formation, and thereafter recovering petroleum oil from said formation through said output well assisted by said fermentation gases.

16. In the recovery of petroleum oil from an oil-bearing formation having a well leading thereto, the method comprising inoculating said formation with a bacteria capable of fermenting a carbohydrate with the production of gases, passing into said formation through said well water containing a water-soluble carbohydrate capable of being fermented by said bacteria, maintaining said water containing said carbohydrate in said formation subject to the action of said bacteria and fermenting said carbohydrate in said formation by said bacteria whereby fermentation gases are produced in said formation, and thereafter recovering petroleum oil from said formation assisted by said fermentation gases.

References Cited in the file of this patent

UNITED STATES PATENTS

| | | |
|---|---|---|
| 2,360,327 | Bailey et al. | Oct. 17, 1944 |
| 2,673,828 | Koepsell et al. | Mar. 30, 1954 |